United States Patent [19]
Lewis et al.

[11] 3,774,151
[45] Nov. 20, 1973

[54] DIAGNOSTIC FIRING CIRCUIT ADAPTED FOR USE WITH INFLATABLE RESTRAINT SYSTEMS IN VEHICLES

[75] Inventors: Donald J. Lewis, Troy; Charles J. McMillin, Fraser, both of Mich.

[73] Assignee: Allied Chemical Corporation, New York, N.Y.

[22] Filed: Sept. 2, 1971

[21] Appl. No.: 177,559

[52] U.S. Cl.................. 340/61, 340/52 H, 180/91
[51] Int. Cl............................................ B60r 21/00
[58] Field of Search................... 340/52, 52 H, 53, 340/61; 200/61.45; 180/91, 103, 104

[56] References Cited
UNITED STATES PATENTS

| | | |
|---|---|---|
| 3,633,159 | 1/1972 | Dillman ........................... 340/52 H |
| 3,622,974 | 11/1971 | Best ................................. 340/52 H |
| 3,668,627 | 6/1972 | Brainerd ......................... 180/103 X |
| 3,676,844 | 7/1972 | Hendrickson ....................... 340/66 |

*Primary Examiner*—Alvin H. Waring
*Attorney*—Jonathan Plaut et al.

[57] ABSTRACT

An electric circuit assembly for transmitting a signal to initiate the inflation of a gas bag safety assembly in an automobile when the vehicle is involved in a collision. The circuit assembly is provided with diagnostic means to allow the driver to monitor the readiness of the circuit for operation and detect any malfunction in the assembly. Upon start-up of the vehicle, indicator means in the circuit assembly, in the form of a pair of warning lamps, indicates whether the circuit assembly is operating normally. One of the lamps is normally lit for a short period after the ignition switch is closed. The other lamp only becomes lit when the first lamp fails to light. The circuit is formed so as to operate properly despite the failure of various of its components.

11 Claims, 5 Drawing Figures

INVENTORS
Donald J. Lewis &
BY Charles J. McMillin, Jr.
Barnard, McGlynn & Reising
ATTORNEYS

PATENTED NOV 20 1973 3,774,151

INVENTORS
Donald J. Lewis &
BY Charles J. McMillin, Jr.

Barnard, McGlynn & Reising
ATTORNEYS

DIAGNOSTIC FIRING CIRCUIT ADAPTED FOR USE WITH INFLATABLE RESTRAINT SYSTEMS IN VEHICLES

BACKGROUND OF THE DISCLOSURE

1. Field of the Invention

The instant invention is directed to an electric circuit assembly for transmittal of an electrical signal to initiate a gas generator of an inflatable gas bag assembly disposed in a motor vehicle when the vehicle becomes involved in a collision. More specifically, the instant invention is directed to such a circuit assembly which is constructed so as to properly perform despite failures of some of its components and includes signal means so that a driver may monitor and diagnose the condition of the circuit.

2. Description of the Prior Art

The recent development of passive vehicle occupant restraint systems gives promise of significantly decreasing the number of fatalities and serious injuries resulting from motor vehicle accidents. Among the passive restraint systems suggested in the prior art, the inflatable gas bag restraint system is the most promising.

One critical element of such restraint systems is the firing circuit assembly which is employed to transmit an electrical signal, upon impact of the vehicle, to an initiator means to initiate the flow of gas into the gas bags of the gas bag assembly.

It is obviously of prime importance that the gas bags inflate only under collision circumstances which would endanger the safety of the vehicle occupants in the absence of the inflated bags. If the bags were to erroneously fire at a time when they were not needed they might momentarily hamper the ability of the driver to control the car. If they fail to inflate in the proper collision circumstances they are of course useless to the driver.

The problem of reliability of the firing circuit is aggravated by the fact that once the circuit is in the vehicle there is no way to test it under actual operating conditions as one might test a horn or headlight. Moreover, the firing circuit may be a number of years old before it is actually called on to fire a bag.

Another problem associated with the firing circuit is the fact that it is intended to operate in the event of a collision and the very impact of the collision may affect the firing circuit so as to disable it. For example, components may be disconnected or become shorted out during the impact or the battery which serves as a power source for the firing circuit may become disconnected.

SUMMARY OF THE PRESENT INVENTION

The present invention is directed to a firing circuit for an inflatable bag safety system which is adapted to reliably operate after long periods of installation in the vehicle, despite the conditions of an impact, and is adapted to provide a signal to the driver if the circuit becomes disabled at any time during operation of the vehicle.

The circuit achieves a reliability which surpasses the reliability of most of its individual components by a unique redundancy arrangement. First, the power supply itself is made redundant by using the vehicle battery to charge a capacitor each time the vehicle starts up. Thereafter, either one of the battery or the capacitor is capable of firing the bag in the event of impact. Additionally, many of the key components are arranged in redundant groupings so as to provide proper operation of the system despite the failure of individual elements.

A signal light system is provided which acts as a visual alarm to the driver in the event of improper condition of the system prior to firing.

One preferred embodiment of the signal system employs two lamps, disposed on the dashboard of the vehicle. In normal operation of the system one lamp will be lit for a few seconds after the ignition switch is closed and the second lamp will remain off. If the system becomes defective in any of a variety of probable failure modes the lamp system will not operate in the normal manner upon closure of the ignition switch. Either the second lamp will become lit during operation of the vehicle, or the first lamp will fail to light, or both of these events will occur. The driver is thus warned that the firing system may not operate properly in the event of impact.

The lamp which is normally lit for a few seconds after the ignition switch is closed essentially monitors the charging of the capacitor from the vehicle storage battery. The capacitor is shunted with a resistor which acts to discharge the capacitor within a short period of time after the ignition switch is opened. Accordingly, when the ignition switch is later closed, to restart the vehicle, the capacitor is initially charged from the storage battery. The first lamp experiences the potential difference between the storage battery and the capacitor and remains lit as long as the charging is occurring above a predetermined level. Accordingly, the first lamp will normally be lit for a few seconds after closure of the switch and will monitor the charging and the state of that portion of the circuitry which is involved in the charging. The second lamp essentially monitors the lighting of the first lamp. If the first lamp has lit upon closure of the ignition switch the second lamp will remain deenergized until the next closure of the ignition switch. If the first lamp fails to light the second lamp will become energized and remain energized as long as the ignition switch is closed. The circuitry associated with this second lamp preferably monitors either radiation from the first lamp, such as light or infrared radiation, or the current level in the connecting circuit for the first lamp, such as by induction coil. It is of importance that the circuitry from the second lamp be electrically isolated from the first lamp circuitry so that malfunctions of the first lamp circuitry will not affect the operation of the second lamp.

In alternate embodiments of the invention other types of alarms such as buzzers or other forms of audible alarms may be substituted for the lamps of the first preferred embodiment. The placement of the grounds in the circuit is such that the state of other portions of the system, not connected with the charging, may be monitored at the same time.

Other applications, advantages and objectives of the present invention will be made apparent by the following detailed description of the preferred embodiment.

BRIEF DESCRIPTION OF THE DRAWINGS

A preferred embodiment of the invention is described which makes reference to the accompanying drawings in which.

DESCRIPTION OF THE PREFERRED EMBODIMENT

Figure 1:
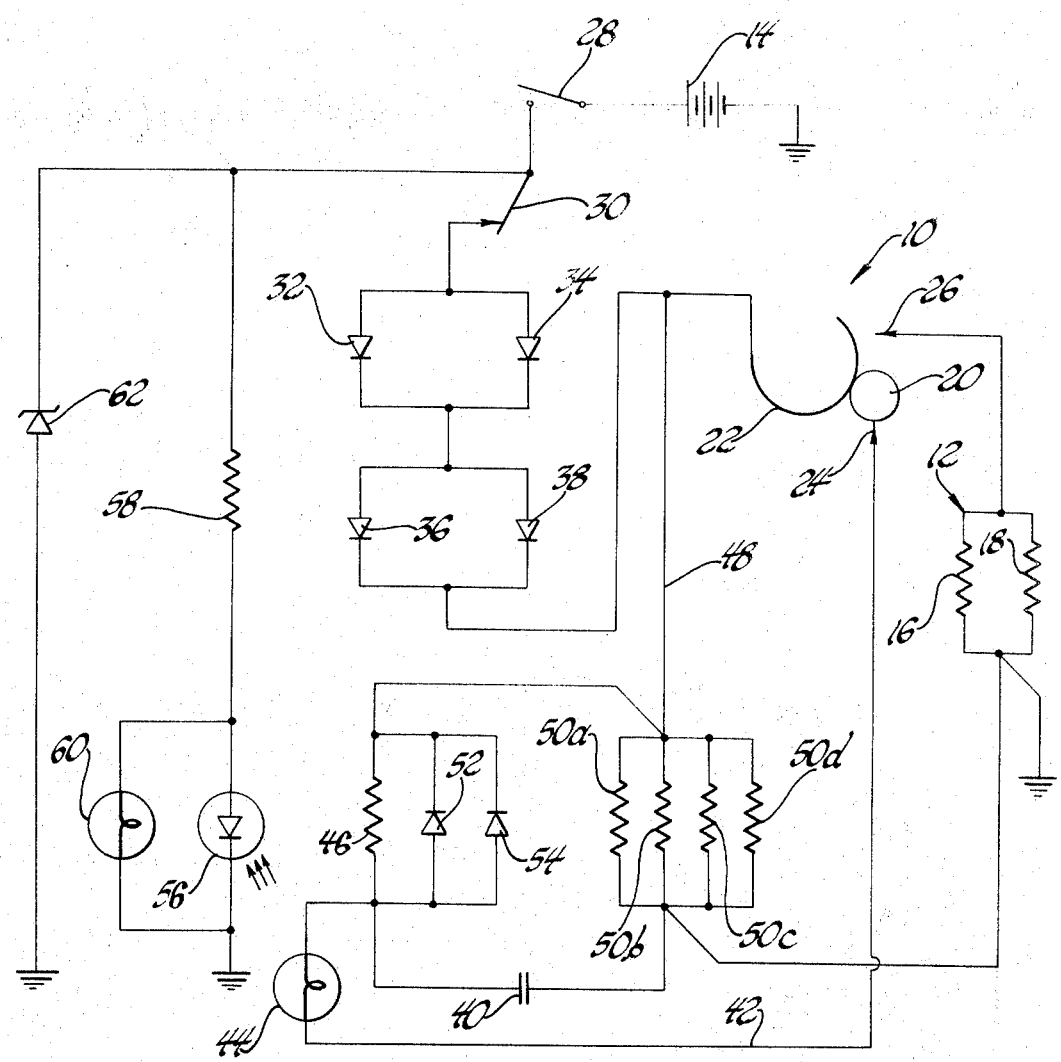
FIG. 1 is a schematic electrical wiring diagram of the circuit assembly of the present invention.

Referring to FIG. 1, a circuit forming a preferred embodiment of the invention incorporates a normally open impact sensing switch, generally indicated at 10, which broadly operates to connect a pair of electro-explosive devices, generally indicated at 12, to the vehicle battery, generally indicated at 14, in the event of a collision.

The electro-explosive devices are schematically illustrated as a parallel combination of a pair of resistive elements 16 and 18. The elements 16 and 18 are the type generally employed with proposed gas bag systems such as the ones disclosed in pending patent application Ser. No. 81,947, filed Oct. 19, 1970, now U.S. Pat. No. 3,674,059 assigned to the assignee of the present invention. The unit 16 is termed a "squib" and acts to initiate the generation of gas by pyrotechnic apparatus (not shown) associated with the gas bag. The element 18 is termed a "detonator" and acts to knock out a plug which separates a gas tank from the uninflated bag. The device is capable of firing upon the energization of the squib alone, without operation of the detonator, and thus provides a measure of redundancy to the system.

The impact sensor switch 10 is preferably of the type manufactured by Technar Incorporated of Pasadena, California and denominated their Model A-1 Crash Sensor. Essentially, it is a single-pole-double-throw switch which switches upon being subjected to a decelerative force of approximately 10 Gs in an appropriate direction. Other known deceleration sensors could be used in alternate embodiments of the invention.

The sensor 10 is schematically illustrated as having a ball 20 which rides on the outer side of a curved spring 22. The spring connects to the input terminal of the switch and the ball, which is conductive, rides between a normally closed terminal 24 and a normally open terminal 26. In the event of an impact of the type intended to inflate the bags the ball 20 moves away from the contact 24 and into abutment with the contact 26 thereby disconnecting the contact 24 from the input terminal and connecting contact 26 to the input.

The battery 14 has its negative terminal connected to ground and its positive terminal connected to an ignition switch 28. The other terminal of the ignition switch is connected to a low pressure sensor switch 30. The sensor switch 30 is of the type that is disclosed in United States Patent application Ser. No. 82,562 entitled "A Vehicle Safety Assembly" filed Oct. 12, 1970, now U.S. Pat. No. 3,680,884. The switch is closed as long as the pressure in the associated gas tank is sufficiently high to inflate the bag in the event of a collision. If the pressure falls below this threshold level the switch 30 opens.

The input terminal 22 of the impact sensor switch 10 is connected to the battery, when the switches 28 and 30 are closed, through a set of diodes 32, 34, 36 and 38. The diodes 32 and 34 are connected in parallel to one another as are the diodes 36 and 38 and the two pairs are connected in series. Each of the diodes has the voltage rating and current capacity sufficient to carry the entire firing current and in a normal, non-redundant circuit, only a single diode would be provided to perform the function of these four elements.

This redundant arrangement insures proper operation of the system despite the failure of any one of the diodes. If any of the diodes becomes open circuited, its companion diode in the parallel set is operative to carry the current. If any of the diodes become short circuited, the other parallel pair provides the unidirectional current limiting capability.

Thus, in normal operation of the circuit, with the ignition switch closed and the low pressure sensor switch 30 closed, if the vehicle were to become involved in a collision which would cause the ball 20 of the sensor switch 10 to move into contact with the terminal 26 the full current of the battery would pass through the electro-explosive devices 12, which have one end grounded, through the diode 32, 34, 36, 38 and the impact sensor 10.

A capacitor 40 is provided in the circuit to act as an alternate power source for the electro-explosive devices 12 in the event of failure of the battery 14 at the time of impact. The capacitor is large, having a rate of 12,000 microfarands in the preferred embodiment of the invention. One end of the capacitor 40 is connected to ground through a conductor 42. The other end of the capacitor connects to the positive terminal of the battery through a lamp 44 which is connected to the normally closed contact 24 of the impact sensor switch 10. Thus, the capacitor 40 is charged to substantially the potential of the battery 14 when the ignition switch 28 and the low pressure sensor switch 30 are closed and the impact sensor switch 10 is in its normal condition.

A resistor 46 provides an alternate charging path for the capacitor 40 through a conductor 48 in the event that the lamp 44 is burned out or is removed from its socket. The resistor 46 has a substantially higher resistance than the lamp so that when the lamp is in place the charging of the capacitor occurs substantially through the lamp. In the preferred embodiment the lamp may have a resistance of 180 ohms and the resistor 46 may have a value of 27,000 ohms.

When the capacitor 40 is disconnected from the battery it is discharged at a relatively low rate through the resistor 46 and a group of four parallel resistors 50a, 50b, 50c and 50d. These resistors 50 are in series with the resistor 46 across the capacitor. The four resistors have a relatively low resistance such as approximately 180 ohms each. Four are provided so that in the event of one of the resistors becoming open the path resistance will not be increased appreciably.

The capacitor 40 thus forms an alternate power source for activating the electro-explosive devices 12 at such time as the sensor switch 10 activates the circuit. In the event of an impact which disconnects the battery, as sometimes occurs because of the high inertia of the battery, the capacitor 40 will quickly discharge through the electro-explosive devices which have a resistance of about 4.50 ohms each. This discharge path includes a pair of diodes 52 and 54 which are disposed in parallel with one another to provide a firing path even if one of the units opens.

Because of the discharge of the capacitor 40 through the resistors 46 and 50 after the ignition switch 28 is opened, when the driver later restarts the vehicle the capacitor 40 will initially be in a discharged state. As soon as the ignition switch 28 is closed the capacitor begins to charge through the diodes 32, 34, 36 and 38, the sensor switch 10 and the lamp 44. The potential difference which exists between the capacitor 40 and the battery during this charging period causes the lamp 44 to light. The constants of the circuit are such that the charging normally takes about 5 seconds. After that time the capacitor will have substantially the same charge as the battery, and no current will flow through the lamp 44.

The lamp 44 is physically located on the dashboard of the vehicle so as to be clearly visible to the driver and the lighting of the lamp which takes place when the ignition switch is closed is one of the diagnostic indications which ar provided to the driver and will be discussed more fully subsequently.

A light activated silicon controlled switch 56 is physically positioned with respect to the lamp 44 so as to receive light from the lamp at such time as the lamp is energized. The light sensitive switch is a device which is normally nonconductive and becomes conductive when a proper direct current potential exists between its anode and cathode and it receives light.

In the preferred embodiment of the invention the light sensitive switch 56 constitutes a switch having one end grounded and the other end connected to the ignition switch through a current limiting resistor 58. Before the ignition switch 28 is closed the conductor 48 is in its conconductive condition. As the ignition switch is closed if the lamp 44 lights the unit 56 will go into its conductive state within a few milliseconds and will remain in that state until the ignition switch opens, despite the subsequent turn-off of the lamp 44.

The switch 56 shunts a second lamp 60 which is also disposed on the dashboard so as to be visible to the driver. When the unit 56 is in its conductive state it shorts out the lamp 60 so that the lamp is not energized. In the normal operation of the circuit when the ignition switch 28 is closed the lamp 60 will only be energized for the few milliseconds required for the lamp 44 to reach a sufficient illumination level to energize the unit 56 into its conductive state wherein it shorts out the lamp 60. Thus, in normal operation of the vehicle the lamp 60 will not be lit when the ignition switch is on. However, in the event of failure of the lamp 44 to light upon closure of the ignition switch, for any number of reasons, the lamp 60 will remain burning as long as the ignition switch is closed and will thus act as a signal to the driver that there is some malfunction of the firing circuit.

In the event that the driver 44 did not notice whether the light 44 went on when he closed the ignition switch, and the lamp 60 is lit, the driver may open the ignition switch, and then close it again after a few seconds. He can then determine whether the lamp 60 lit because failure of the lamp 44 to light or because failure of its circuitry such as the improper operation of the light activated switch 56.

The circuit is completed by a Zener diode 62 which is disposed between the ignition switch and ground and acts as a voltage limiter for the entire system. In the event that a high voltage signal is somehow impressed between the battery and ground the Zener 62 will limit the voltage provided to the firing circuit to substantially that of the battery.

It will be noted that the schematic diagram is somewhat unusual in the interconnection of the elements. For example, the right hand end of the capacitor 40 is illustrated in FIG. 1 as connected to ground through the connector 42 which also joins one end of the electro-explosive devices 12 and one end of the resistors 50a, 50b, 50c and 50d to ground. This connection 42 represents the actual manner in which the circuit is wired and this is done to provide various diagnostic checks through the lamps 44 and 60. For example, if the ground wire for the electro-explosive device 12 becomes open the capacitor 40 will not change upon closure of the ignition switch and accordingly the lamp 44 will not light and the lamp 60 will remain lit signalling a malfunction to the driver.

If the device 12, the resistor 50 and the capacitor 40 were each independently grounded, the lamp would not operate to test all their grounds.

As has been previously noted, either an open or a short in the diodes 32, 34, 36 and 38 will be corrected by their redundancy. In a similar manner the only malfunction of the diodes 52 and 54 which could effect the system would be a short in one of the diodes and in that event the capacitor 40 would effectively be shorted and the light 44 would not be lit by closure of the ignition switch. A short in the resistor 46 would produce the same effect. If the resistor 46 became opened the system would still operate properly as long as the lamp 44 was not opened. It should be noted that when the lamp 44 is open, charging of the capacitor takes place through the resistor 46, and the lamp 60 will remain lit but the system will still be in condition to inflate the bags in the event of an impact. If the capacitor 40 becomes open the lamp 44 will not light upon the ignition switch closing and if the capacitor 44 becomes shorted the lamp 44 will remain lit as long as the ignition switch is closed.

Since the map 44 will not light if the low pressure switch 30 is open the system also provides a check for low pressure and eliminates the need for a separate low pressure indicator lamp which was previously considered as required for such systems.

It is of importance to the proper operation of the present invention that the circuitry for energizing the lamp 60 be electrically isolated from the circuitry for energizing the lamp 44 so that malfunctions of one of the circuits does not render the other circuit inoperative. Alternative arrangements for coupling the two lamp circuits are illustrated in FIGS. 2a, 2b and 2c.

Figure 2A:
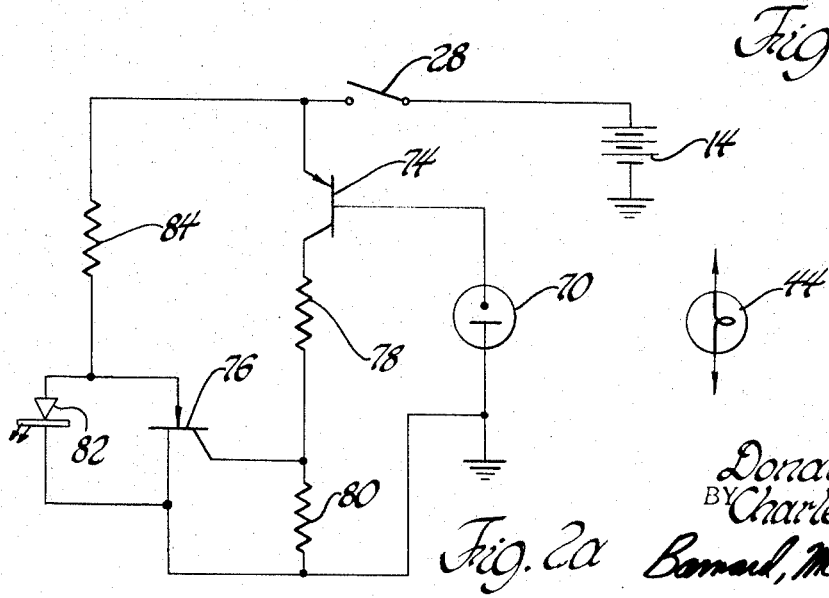
FIG. 2a is a schematic diagram of an alternative embodiment of the circuitry for energizing the second lamp, using a photocell to detect radiation from the first lamp.
Figure 2B:
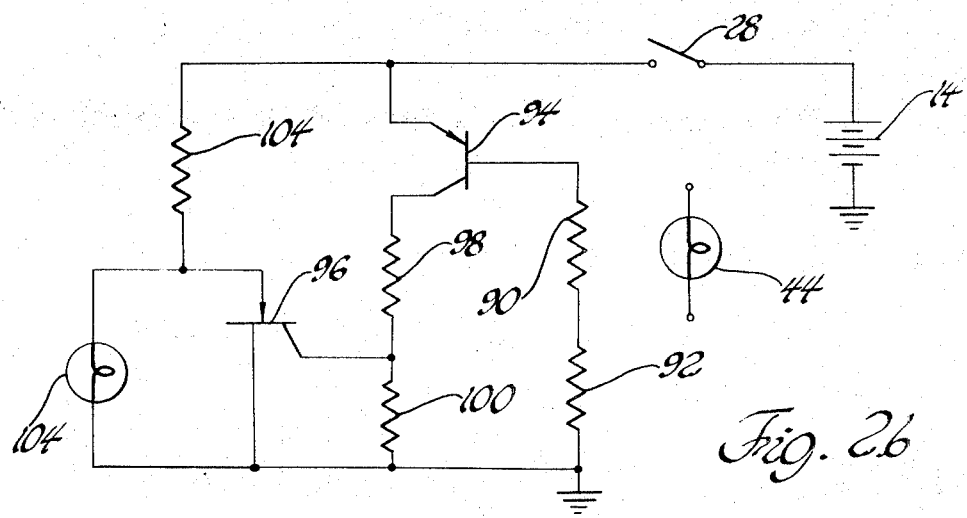
FIG. 2b is a schematic diagram of an alternative embodiment of the circuitry for energizing the second lamp, using an infrared detector to monitor the operation of the first lamp.
Figure 2C:
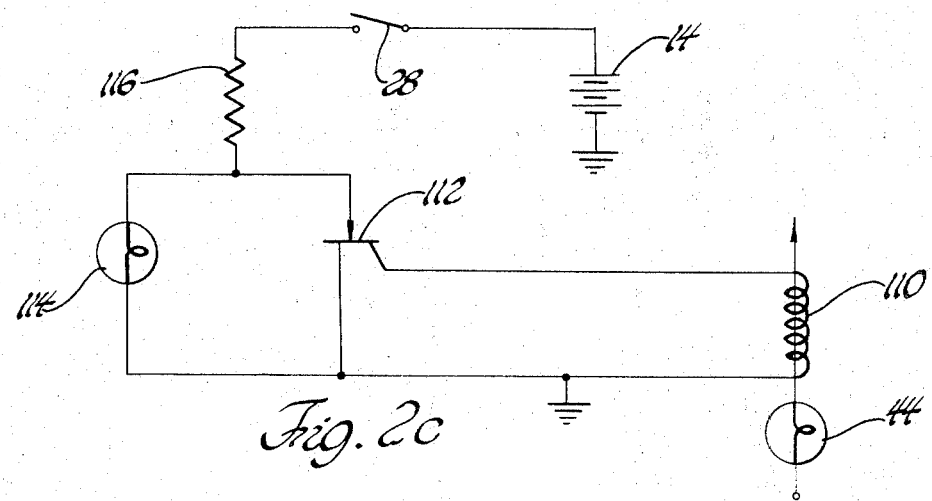
FIG. 2c is a schematic diagram of an alternative embodiment of the circuitry for energizing the second lamp wherein an inductance coil is used to monitor the proper operation of the first lamp.

FIG. 2a illustrates an alternative embodiment of the invention wherein the circuitry for controlling the lamp 60 employed in the embodiment of the invention of FIG. 1 is replaced by a photocell detector and the lamp 60 is replaced by a light emitting diode. Only that portion of the circuitry directly associated with the second signalling device is illustrated in FIG. 2a and the balance of the diagnostic circuitry may be identical to that illustrated in FIG. 1.

Referring to FIG. 2a, a photocell or solid state photodetector 70 of the photoresistive type is physically disposed adjacent to the lamp 44 so as to receive light emitted by the lamp. The photocell 70 is connected between the base of a transistor 74 and a ground connection. The emitter of the transistor 74 is connected to the positive terminal of the battery 14 through the ignition switch 28. The collector of the transistor 74 is connected to the gate of a silicon controlled rectifier 76 through a resistor 78. The gate is also connected to ground through a resistance 80.

a light emitting diode 82, which constitutes the second signalling device, is physically disposed on the dashboard of the vehicle so as to be visible to the driver. The light emitting diode 82 has one terminal connected to ground and the other terminal connected to the positive terminal of the battery 14 through a current limiting resistor 84. The light emitting diode is shunted by the anode-cathode circuit of the silicon controlled rectifier 76. The arrangement of such is that the light emitting diode is energized at such time as the controlled rectifier 76 is in its non-conductive state, and the diode 82 is effectively shorted when the controlled rectifier becomes conductive. When no light reaches the photocell 70 the base resistance of the transistor 74 is sufficiently high to prevent the substantial flow of collector current. However, when the lamp 44 becomes lit, providing light to the photocell 70, the base resistance of the transistor 74 drops to the point where the collector current of the transistor 74 becomes sufficiently high so that the controlled rectifier 76 fires into its conductive state. This shunts the light emitting diode 82 so as to prevent it from operating.

In the event that the lamp 44 fails to light when the ignition switch 28 is closed the controlled rectifier 76 remains in its non-conductive state and the light emitting diode 82 is energized providing a visual signal to the operator of the improper state of the firing circuit.

It should be recognized tha the lamp 44 could be replaced by another form of light emitting diode such as a light emitting diode.

FIG. 2b illustrates another alternative embodiment of the second signal lamp circuit. In this case a temperature sensitive resistance element 90 is physically disposed relative to the lamp 44 so as to detect non-visible radiation emitted by the lamp. The temperature sensitive element 90, normally termed a thermistor, is disposed electrically in series with a second temperature sensitive resistor 92 which is physically isolated from the lamp 44 so as not to receive its radiation. The temperature sensitive resistor 92 has a temperature-resistance curve which slopes in the opposite direction to that of the thermistor 90. Accordingly, if both are at the same temperature, their combined resistances will be approximately equal relatively independent of that ambient temperature. However, when the thermistor 90 is subjected to the thermal radiation resulting when the lamp 44 is lit, its resistance sharply decreases. Since the temperature sensitive resistance element 92 is insulated from the radiation from the lamp 44 its resistance will remain the same and the resistance of the pair decreases appreciably.

The temperature sensitive resistors 90 and 92 are disposed in the grounded base circuit of a transistor 94. The emitter of the transistor 94 connects to the positive terminal of the battery 14 through the ignition switch 28 while the collector connects to the gate of a controlled rectifier 96 through a resistor 98.

The gate of the controlled rectifier 96 is also grounded through a resistance 100. The second signal lamp 102 connects to the positive terminal of the battery 14 through the switch 28 and current limiting resistor 104. The other end of the lamp is grounded.

The lamp 104 is shunted by the gate-cathode circuit of the controlled rectifier 96 so that when the controlled rectifier is conductive the lamp is effectively short circuited.

When the ignition switch 28 is closed the power applied to the lamp 44 causes it to light and its radiation lowers the resistance of the thermistor 90 to the point where the transistor 94 becomes substantially conductive. This raises the voltage on the gate of the controlled rectifier to the point where the controlled rectifier becomes conductive shorting the lamp 104. Therefore, in normal operation of the circuit the lamp 104 will be energized from a few milliseconds upon closure of the switch 28 and will then be extinguished.

In the alternative embodiment of the second lamp circuit illustrated in FIG. 2c an inductance coil 110 surrounds a conductor leading to the lamp 44.

The coil 110 is disposed between ground and the gate of the controlled rectifier 112. The controlled rectifier shunts the second signal lamp 114 which is connected to the positive terminal of the battery 14 through the ignition switch 28 and a current limiting resistor 116. When the ignition switch is closed the current flowing to the lamp 44 abruptly changes from zero to a value dictated by the voltage of the battery and the resistance of the current. This current change induces a current in the coil 110 which appears as a positive pulse at the gate of the controlled rectifier 112. The controlled rectifier is thus quickly fired, shunting the lamp 114 and preventing further operation of the lamp.

Figure 2D:
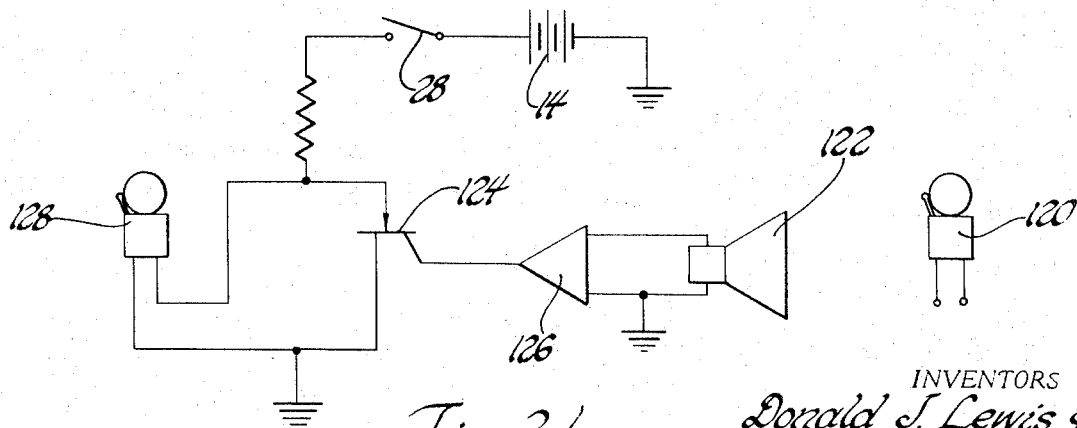
FIG. 2d is a schematic diagram of another alternate embodiment of the invention wherein the first lamp is replaced by a sonic alarm unit and the second lamp circuit employs a sonic detector to monitor the operation of the first alarm.

FIG. 2d schematically illustrates an embodiment of the invention wherein the first lamp 44 is replaced by an audible alarm device 120 which is schematically illustrated as constituting a bell and may take the form of a buzzer, horn or other audible device. The audible alarm 120 is disposed in the circuitry of FIG. 1 so as to be energized at the time the ignition switch 28 is closed. A sonic detector 122, schematically illustrated as a microphone, is physically coupled to the alarm unit 120 so as to receive a strong audible signal at such time as the alarm is energized. The sonic detector 122 is also insulated from other vehicle noises so as to insure that it will not receive extraneous signals of a level similar to that produced by the alarm 120.

The sonic detector 122 is coupled to the gate of a controlled rectifier 124 through a suitable amplifier 126.

The cathode-anode circuit of the controlled rectifier 124 shunts a second sonic signal device 128 which preferably produces a sound which is distinctly different from that of the unit 120 so that it will be readily distinguishable by the driver and sound from the device 128 does not tend to fire the controlled rectifier 124. Alternatively, the signal 128 could take the form of a lamp or other light emitting device.

When the ignition switch 28 is closed the signal device 120 will be energized and will cause the controlled rectifier 124 to fire and thereby short out the second signal device 128.

It is, therefore seen that a variety of control arrangements may be established whereby the normal operation of the diagnostic circuit will produce a first alarm signal to the driver and the absence of such an alarm signal at an appropriate time will cause a second alarm signal to be produced.

Accordingly, it is seen that the present system not only provides a redundancy which insures proper system operation in most failure modes but additionally incorporates a failure detection system which signals the driver of a potential malfunction of the system.

Having thus described my invention, I claim:

1. A system for energizing the firing means of an inflatable safety system for a vehicle, comprising: a first electrical power storage means; a second electric power storage means connected to said first electrical power storage means so as to be charged from said first electrical power storage means; an impact sensor switch disposed in said vehicle and having a first normal state, and a second state to which the switch moves in the event of impact; circuit means connecting said first electrical power storage means, said second electrical power storage means, said impact sensor switch and said firing means so that at least one of said first and second electrical power storage means discharged through said firing means at such time as said switch moves into its second state; a first signal means disposed in said circuit means in series with said second electrical power storage means so as to be energized at such time as said second electrical power storage means is being charged from said first electrical power storage means; and a second signal means disposed in said circuit means in association with a monitoring means responsive to energization of said first signal means, said monitoring means being operative to prevent energization of said second signal means upon energization of said first signal means.

2. The system of claim 1 wherein said first electrical power storage means comprises the vehicle storage battery.

3. The system of claim 2 wherein said second electrical power storage means comprises a capacitor.

4. The system of claim 1 wherein said circuit means has such a configuration that each of said first electrical power storage means and said second electrical power storage means is capable of discharging through said firing means upon the movement of said impact sensor into its second condition, independent of the condition of the other power storage means.

5. The system of claim 3 wherein said capacitor is shunted with an element having a resistance substantially higher than that of said firing means.

6. The system of claim 5 wherein the vehicle ignition switch is connected between said battery and the balance of said circuit means so the battery is disconnected from the balance of the circuit means at such time as the ignition switch is opened and the capacitor discharges through said element after opening of the ignition switch.

7. The system of claim 2 including a unidirectional conducting means connected between said battery and said second electrical power storage means, which allows said battery to charge said second electrical power storage means.

8. The system of claim 7 wherein said unidirectional conducting means comprises a plurality of diodes each of which is individually capable of carrying the full current drawn at such time as said vehicle battery discharges through said firing means.

9. The system of claim 1 wherein said second electrical power storage device is a capacitor.

10. The system of claim 9 wherein said first signal means constitutes a lamp disposed in the vehicle so as to be visible to the driver.

11. The system of claim 1 wherein said first electrical power storage means is grounded to the frame of the vehicle, and the circuit means is grounded to the frame of the vehicle so that said first signal means will not be energized unless both of said frame grounds are in operation.

* * * * *

PO-1050
(5/69)

UNITED STATES PATENT OFFICE
CERTIFICATE OF CORRECTION

Patent No. 3,774,151      Dated November 20, 1973

Inventor(s) Donald J. Lewis and Charles J. McMillin

It is certified that error appears in the above-identified patent and that said Letters Patent are hereby corrected as shown below:

Column 5, line 26, "ar" should read -- are --.

Column 5, line 62, "driver 44" should read -- driver --.

Column 6, line 21, "change" should read -- charge --.

Column 6, line 47, "map" should read -- lamp --.

Column 6, line 57, "Alternative" should read -- alternate --

Column 7, line 12, "a" should read -- A --.

Column 7, line 40, "tha" should read -- that --.

line 41, "diode" should read -- device --.

Column 10, line 29, "claim 1" should read -- claim 7 --.

Signed and sealed this 9th day of April 1974.

(SEAL)
Attest:

EDWARD M. FLETCHER, JR.            C. MARSHALL DANN
Attesting Officer                   Commissioner of Patents